(12) United States Patent
Glenn et al.

(10) Patent No.: US 9,214,885 B1
(45) Date of Patent: Dec. 15, 2015

(54) INDEPENDENT PATHWAYS FOR DETECTING FAULT CONDITION IN ELECTRIC MOTOR

(71) Applicant: Nidec Motor Corporation, St. Louis, MO (US)

(72) Inventors: Douglas D. Glenn, Litchfield, IL (US); Christopher D. Schock, O'Fallon, MO (US)

(73) Assignee: NIDEC MOTOR CORPORATION, St. Louis, MO (US)

( * ) Notice: Subject to any disclaimer, the term of this patent is extended or adjusted under 35 U.S.C. 154(b) by 0 days.

(21) Appl. No.: 14/314,992

(22) Filed: Jun. 25, 2014

(51) Int. Cl.
*H02P 21/00* (2006.01)
*H02P 3/18* (2006.01)
*D06F 33/00* (2006.01)
*H02P 23/00* (2006.01)
*H02P 29/02* (2006.01)

(52) U.S. Cl.
CPC .............. *H02P 23/0077* (2013.01); *H02P 3/18* (2013.01); *H02P 29/027* (2013.01); *H02P 2205/01* (2013.01)

(58) Field of Classification Search
CPC ..... H02P 29/027; H02P 23/0077; H02P 3/18; H02P 2205/01; H02P 3/08; H02P 27/04; H02P 27/06; H02P 29/024; H02P 6/001; H02P 8/24; H02P 8/36

USPC ......... 318/805, 798, 767, 806, 727, 494, 766, 318/764; 68/12.16
See application file for complete search history.

(56) References Cited

U.S. PATENT DOCUMENTS

2008/0295543 A1* 12/2008 Brubaker .................. H02P 3/18 68/12.16

* cited by examiner

*Primary Examiner* — Bentsu Ro
*Assistant Examiner* — Zemenay Truneh
(74) *Attorney, Agent, or Firm* — Hovey Williams LLP

(57) ABSTRACT

An electric motor system having substantially independent hardware-based and software-based pathways for detecting and initiating responses to fault conditions, such as overcurrent conditions, in an electric motor which is powered by a power inverter which is controlled by a power module and a microprocessor. Each pathway involves comparing a voltage, which is representative of an electric current flowing to the motor, to a predetermined maximum voltage, and if the former exceeds the latter using hardware or software to initiate shutting off the motor, such as by shutting off the power inverter. When one pathway detects a fault condition it may notify the other pathway, and the notified pathway may also initiate shutting off the motor.

21 Claims, 3 Drawing Sheets

INDEPENDENT PATHWAYS FOR DETECTING FAULT CONDITION IN ELECTRIC MOTOR

FIELD

The present invention relates to systems and methods for powering electric motors.

BACKGROUND

Electric motors are powered by driving waveforms generated by motor control subsystems. Under certain conditions, motors can experience faults such as abnormal current conditions. Fault protection schemes identify faults and may respond to them by shutting off the motors.

For example, an over-current condition occurs when the current flowing to a motor exceeds a predetermined maximum amount. Hardware-based protection schemes exist for identifying and responding to such a fault condition. Such a scheme may be implemented by a power module component of the motor control subsystem, and may involve sensing a voltage signal associated with the driving waveform, comparing the voltage signal to a predetermined maximum voltage signal, and based thereon, determining whether an over-current condition exists (by Ohm's law, the voltage is representative of the current). If such a condition is determined to exist, then the power module may use hardware to initiate a response that causes the motor to shut off. However, if a problem occurs with the hardware, then the protection scheme may fail to identify or properly respond to the fault condition such that the motor continues to operate under the abnormally high current condition.

This background discussion is intended to provide information related to the present invention which is not necessarily prior art.

SUMMARY

Embodiments of the present invention solve the above-described and other problems and limitations by providing an electric motor system having substantially independent hardware-based and software-based pathways for detecting and initiating responses to fault conditions in electric motors, thereby combining the speed of a hardware-based protection scheme with the better redundancy of a software-based protection scheme.

In an embodiment of the present invention, the electric motor system may broadly comprise an electric motor and a motor control subsystem operable to control the electric motor, including detecting and responding to a fault condition in the electric motor. The control subsystem may include a hardware-based pathway and a software-based pathway for detecting and initiating a response to the fault condition, wherein the pathways are substantially independently operable to detect and initiate their responses to the fault condition.

The hardware-based pathway may include a power module operable to generate a driving waveform to power the motor, a power inverter operable to convert direct current power to alternating current power at a frequency and an amplitude to power the motor, and a first resistor block electrically connected between the power inverter and the power module, and operable to generate a first voltage signal that is representative of an electric current flowing to the motor, wherein the power module compares the first voltage signal to a first predetermined maximum voltage signal, wherein the first voltage signal exceeding the first predetermined maximum voltage signal results in a detected fault condition, and wherein, using hardware, the hardware-based pathway responds to the detected fault condition by initiating shutting off the motor.

The software-based pathway may include a microprocessor connected to the power module, and operable to process digital signals for controlling operation of the power module and the motor, and a second resistor block electrically connected between the power inverter and the microprocessor, and operable to generate a second voltage signal that is representative of the electric current flowing to the motor, wherein the microprocessor compares the second voltage signal to a second predetermined maximum voltage signal, wherein the second voltage signal exceeding the second predetermined maximum voltage signal results in the detected fault condition, and wherein, using software, the software-based pathway responds to the detected fault condition by initiating shutting off the motor.

In various implementations, the electric motor control subsystem may further include any one or more of the following additional features. The motor may be a permanent magnet motor or an induction motor. The fault condition may be an over-current condition in which too much current is flowing to the motor. The fault condition may be an over-current condition, an under-current condition, an over-voltage condition, an under-voltage condition, an over-temperature condition, or an under-temperature condition. The power inverter may be part of the power module. The microprocessor may receive the second voltage signal in analog form and convert it to digital form. The first predetermined maximum voltage and the second predetermined maximum voltage may be adjustable. One or both pathways may shut off the motor by shutting off the power module and the power inverter. Once a pathway detects a fault condition, it may notify the other pathway of the condition. Once notified by the other pathway of the detected fault condition, the notified pathway may also initiate shutting off the electric motor.

This summary is not intended to identify essential features of the present invention, and is not intended to be used to limit the scope of the claims. These and other aspects of the present invention are described below in greater detail.

DRAWINGS

Embodiments of the present invention are described in detail below with reference to the attached drawing figures, wherein.

The figures are not intended to limit the present invention to the specific embodiments they depict. The drawings are not necessarily to scale.

DETAILED DESCRIPTION

The following detailed description of embodiments of the invention references the accompanying figures. The embodiments are intended to describe aspects of the invention in sufficient detail to enable those with ordinary skill in the art to practice the invention. Other embodiments may be utilized and changes may be made without departing from the scope of the claims. The following description is, therefore, not limiting. The scope of the present invention is defined only by the appended claims, along with the full scope of equivalents to which such claims are entitled.

In this description, references to "one embodiment", "an embodiment", or "embodiments" mean that the feature or features referred to are included in at least one embodiment of the invention. Separate references to "one embodiment", "an embodiment", or "embodiments" in this description do not necessarily refer to the same embodiment and are not mutually exclusive unless so stated. Specifically, a feature, structure, act, etc. described in one embodiment may also be included in other embodiments, but is not necessarily included. Thus, particular implementations of the present invention can include a variety of combinations and/or integrations of the embodiments described herein.

Broadly characterized, the present invention provides substantially independent pathways for detecting and initiating responses to fault conditions in electric motors, thereby providing redundant protection against such faults. For example, the pathways may substantially independently detect and initiate responses to over-current conditions. Broadly, a first pathway is hardware-based, and a first motor control component detects the over-current or other fault condition and uses hardware to initiate shutting off the motor. A second pathway is software-based, and involves a second motor control component detecting the over-current condition and using software to initiate shutting off the motor. Both pathways may provide substantially the same result—i.e., each causes the motor to be shut off if an over-current or other fault condition is detected—but, under different conditions, one may be tripped before the other. Furthermore, each pathway has its own advantage: The hardware-based pathway is generally faster and more reliable, while the software-based pathway is generally less expensive and provides redundancy. Thus, the present invention provides the advantages of both protection schemes. In addition to detecting over-current conditions, the system may also be operable to detect other types of fault conditions, such as under-current conditions, over- and under-voltage conditions, and/or over- and under-temperature conditions.

Figure 1:
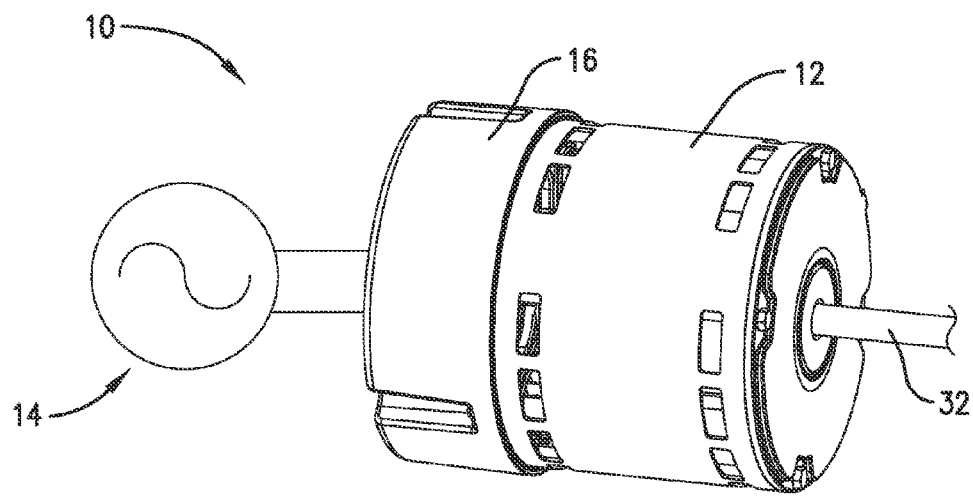
FIG. 1 is a depiction of an electric motor system constructed in accordance with an embodiment of the present invention.
Figure 2:
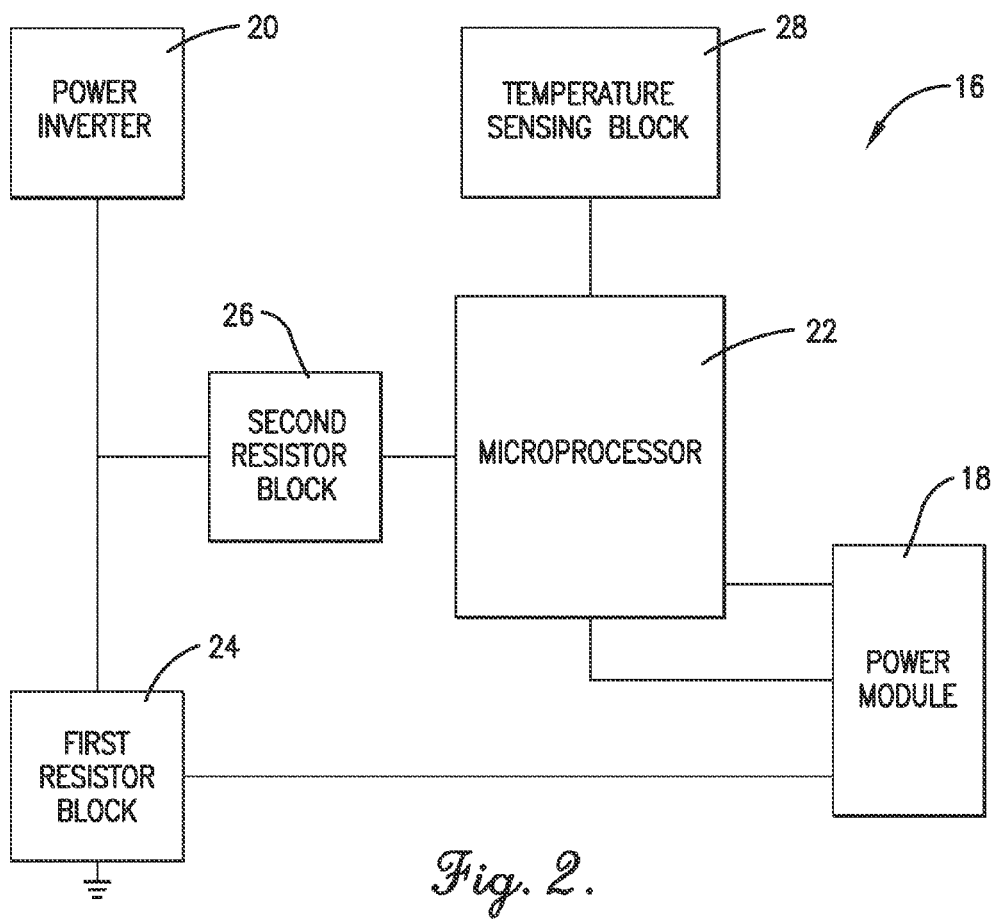
FIG. 2 is a high-level block diagram of components of a motor control subsystem of the motor system of FIG. 1.

Referring to the figures, an electric motor system 10 constructed in accordance with an embodiment of the present invention is shown. Referring to FIG. 1, the motor system 10 may broadly include an electric motor 12; a power source 14; and a motor control subsystem 16. Referring also to FIG. 2, the motor control subsystem 16 may further include a power module 18; a power inverter 20; a microprocessor 22; a first resistor block 24 electrically connected between the power inverter 20 and the power module 18; and a second resistor block 26 electrically connected between the power inverter 20 and the microprocessor 22. The motor system 10 may drive any appropriate load. For example, the motor system 10 may be part of a heating and air-conditioning unit and may drive a blower, pump, or fan, or may be part of an appliance, such as a washing machine or a clothes dryer, which may include additional electrical or mechanical components not described herein.

The electric motor 12 may be a permanent magnet motor or an induction motor. For example, the motor 12 may be a three-phase, ten-pole alternating current (AC) permanent magnet motor rated to operate at a maximum voltage of approximately between 190 Volts and 200 Volts and a maximum current of approximately between 4 Amps and 6 Amps. The motor 12 may include a shaft 32 which transmits the driving force to the load. The power source 14 may be a conventional AC power source, such as a standard 115 Volt or 230 Volt source available in residential and commercial buildings via standard electrical outlets.

The motor control subsystem 16 may be broadly operable to control operation of the motor 12. The power module 18 may be operable to receive power from the power source 14 and generate a driving waveform to power the motor 12. The power inverter 20 may be operable to convert DC power to AC power at a required frequency and amplitude to power the motor 12. In one implementation, the power inverter 20 may be part of the power module 18.

The microprocessor 22 may be operable to process digital signals used to control operation of the motor 12, including signals that enable the operation of and otherwise control operation of the power module 18. The microprocessor 22 is also operable to receive and process signals from other components of the motor system 10, including the power module 18, and, to that end, the microprocessor 22 may be in bi-directional communication with the power module 18. In one implementation, under normal (i.e., no fault) operating conditions the microprocessor 22 may send an enabling signal to enable normal operation of the power module 18, but under abnormal operating conditions, such as when an over-current or other fault condition occurs, the microprocessor 22 may remove the enabling signal and thereby shut off operation of the power module 18, including the power inverter 20, which effectively shuts off the motor 12.

The microprocessor 22 is operable to execute one or more computer programs each comprising a set of executable instructions to accomplish certain signal processing and other functionality, including initiating a response to a detected fault condition. Relatedly, the system 10 may further include a memory (not shown) that is internal to, external to, or otherwise accessible by the microprocessor 22 and operable to store the computer program(s) and any other necessary or relevant information. The memory may be of any suitable type.

The first resistor block 24 is electrically connected in series with the power inverter 20, and electrically connected between the power inverter 20 and the power module 18, and is operable to generate a first voltage signal that is representative of the electric current flowing to the motor 12, and to communicate that first voltage signal to the power module 18.

The second resistor block 26 is electrically connected in series with the power inverter 20, and electrically connected between the power inverter 20 and the microprocessor 22, and is operable to generate a second voltage signal that is representative of the electric current flowing to the motor 12, and to communicate that second voltage signal to the microprocessor 22.

Figure 3:
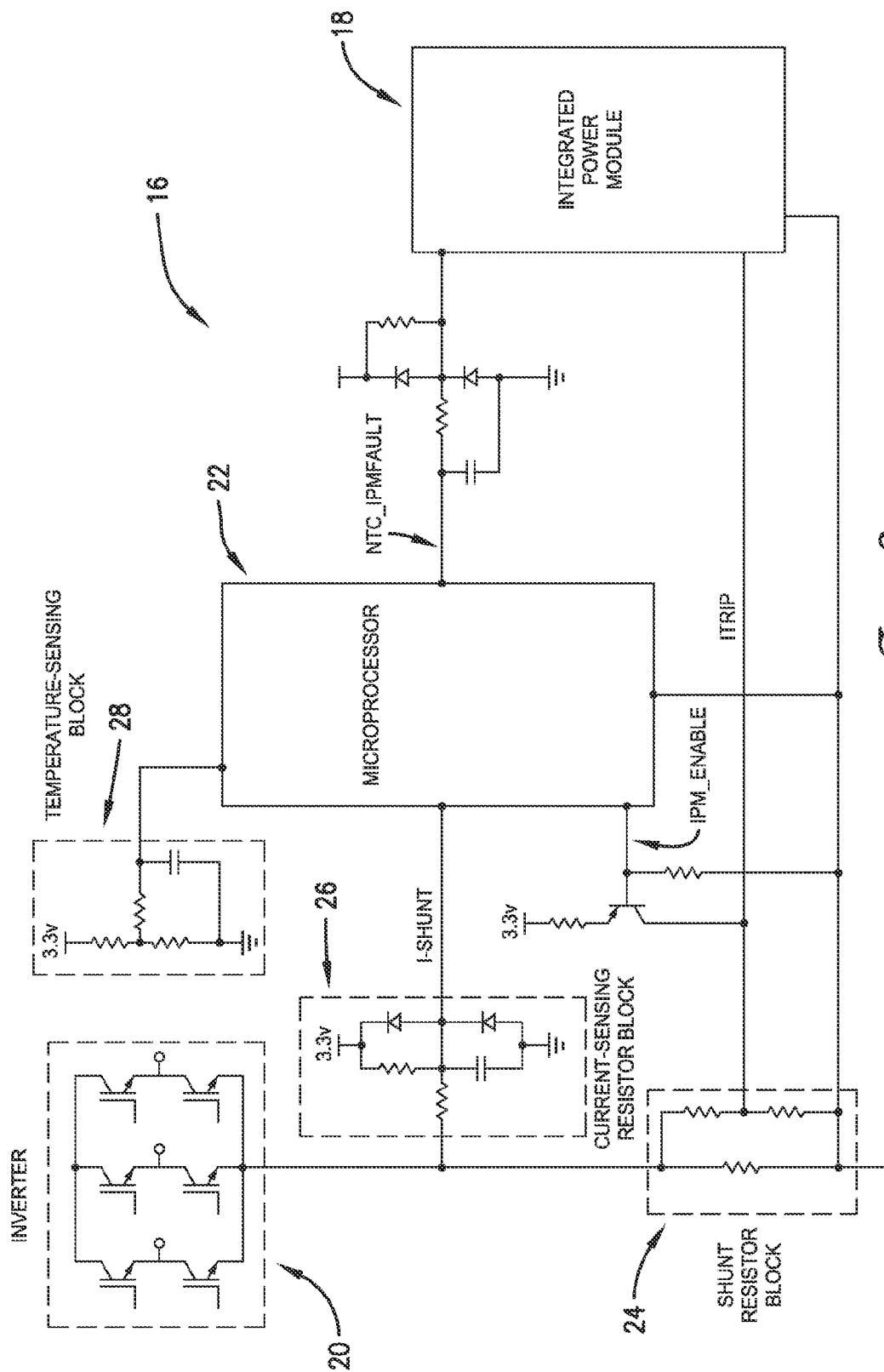
FIG. 3 is a schematic diagram of an example implementation of the high-level block diagram of FIG. 2.

Referring to FIG. 3, one possible, non-limiting implementation of the motor control subsystem 16 of FIG. 2 is shown in greater detail. Other implementations are possible, and the details of any such implementations of the motor system 10 of the present invention will largely depend on the requirements and functionalities of the motor system 10 and its various components.

Figure 4:
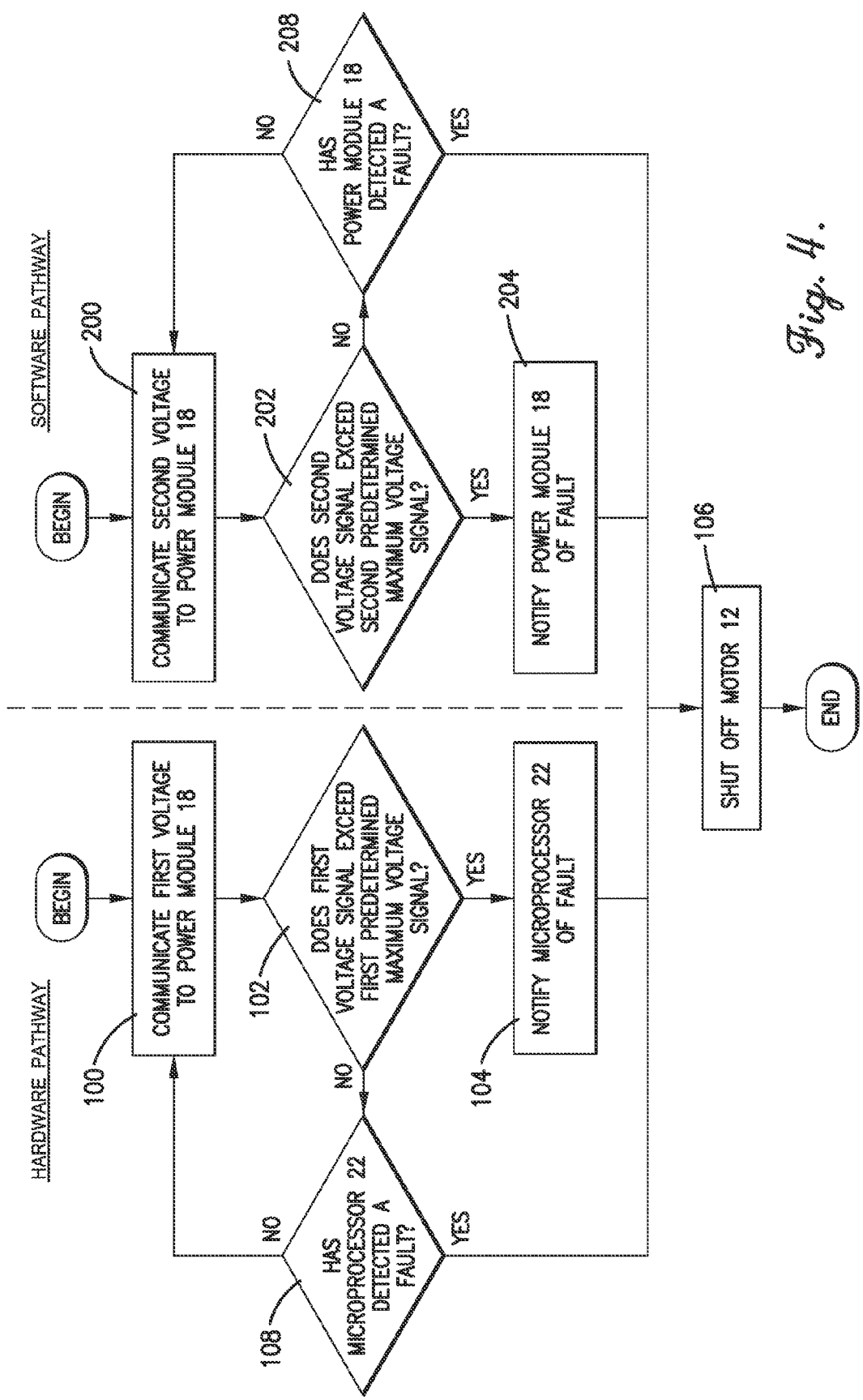
FIG. 4 is a flow diagram of steps involved in the operation of the motor control subsystem of FIG. 2.

In operation, the motor system 10 may function as follows. Referring to FIG. 4, in the hardware pathway, the power module 18 receives the first voltage signal from the first resistor block 24, as shown in step 100. By Ohm's law, this first voltage is representative of the current flowing to the motor 12. The first voltage signal is applied to a first comparator to determine whether the first voltage signal exceeds a first predetermined maximum voltage value, as shown in step 102. If the first voltage signal does exceed the first predetermined maximum voltage, then the power module 18 notifies the microprocessor 22 of the fault condition, as shown in step 104, and shuts off itself and the power inverter 20, which effectively shuts off the motor 12, as shown in step 106. The notified microprocessor 22 may then latch the fault by removing the enabling signal that enables operation of the power module 18, thereby keeping the power module 18 shut off, as shown in steps 208 and 106. If the first voltage signal does not exceed the first predetermined maximum voltage but the microprocessor 22 has notified the power module 18 of a fault condition, as shown in step 108, then the power module 18 shuts off itself and the power inverter 20, which effectively shuts down the motor 12, as shown in step 106.

The first comparator may be internal or external to the power module 18, and may be implemented in hardware; however, the initial response of the hardware pathway to an over-current condition is made by hardware initiating shutting off the motor 12. The first predetermined maximum voltage and other operating characteristics of the hardware pathway may be determined by hardware. For example, in one implementation the first predetermined maximum voltage is approximately 0.47 Volts. Furthermore, the first predetermined maximum voltage may be adjustable to account for different system designs and operating conditions, and may be at least partly determined by the horsepower rating of the motor.

In one implementation involving sensorless control of the motor 12, the hardware pathway may include an operational amplifier (OP AMP) interposed between the first resistor block 24 and the first comparator; however, this OP AMP may not be required to determine and initiate a response to an over-current condition.

In the software pathway, the microprocessor 22 receives the second voltage signal from the second resistor block 26, as shown in step 200. Again, by Ohm's law, this second voltage is representative of the current flowing to the motor 12. The second voltage signal may be in analog form and may be converted to digital form to facilitate further processing by the microprocessor 22. The second voltage signal is amplified by an OP AMP and applied to a second comparator to determine whether the second voltage signal exceeds a second predetermined maximum voltage value, as shown in step 202. If the second voltage signal does exceed the second predetermined maximum voltage, then the microprocessor 22 notifies the power module 18 of the fault condition, as shown in step 204, and shuts down the power module 18 and the power inverter 20, which effectively shuts down the motor 12, as shown in step 106. If the second voltage signal does not exceed the second predetermined maximum voltage but the power module 18 has notified the microprocessor 22 of a fault condition, as shown in step 208, then the microprocessor 22 shuts down the power module 18 and the power inverter 20, which effectively shuts down the motor 12, as shown in step 106. The microprocessor 22 may further respond to the fault condition by shutting off additional or even all outputs of the microprocessor 22 and/or other components of the motor control subsystem 16.

The OP AMP and/or the second comparator may be internal or external to the microprocessor 22, and may be implemented in hardware or software; however, the initial response of the software pathway to an over-current condition is made by software initiating shutting off the power module 18. The gain of the OP AMP and the predetermined maximum voltage and other operating characteristics of the software pathway may be determined by software, hardware or a combination of both. For example, in one implementation the gain of the OP AMP is approximately 2.5, and the second predetermined maximum voltage is approximately 0.875% of the supply voltage (VCC). Furthermore, the second predetermined maximum voltage may be adjustable to account for different system designs and operating conditions, and may be at least partly determined by the horsepower rating of the motor.

In one implementation, the hardware and software pathways may be substantially independent, with few or no shared components. In another implementation, the power module 18 may use the same resistor block and/or comparator, and/or, depending on the design, the same OP AMP, used by the microprocessor 22, in which case the first and second resistor blocks are the same resistor block, and/or the first comparator and the second comparator are the same comparator. As mentioned, the comparator and the OP AMP used by the microprocessor 22 may be implemented on the microprocessor.

Referring again to FIGS. 2 and 3, in one implementation of the present invention, the motor system 10 may further include a temperature-sensing block 28 in electrical communication with the microprocessor 22, and operable to sense an operating temperature of the motor 12. In operation, the microprocessor 22 receives input from the temperature-sensing block 28, determines whether a low- or over-temperature fault condition exists, and if such a fault condition exists, initiates shutting off the motor 12.

The present invention provides advantages over the prior art, including that it provides substantially independent hardware-based and software-based pathways for detecting and initiating responses to fault conditions in electric motors, thereby combining the speed of a hardware-based protection scheme with the better redundancy of a software-based protection scheme.

Although the invention has been described with reference to the one or more embodiments illustrated in the figures, it is understood that equivalents may be employed and substitutions made herein without departing from the scope of the invention as recited in the claims.

Having thus described one or more embodiments of the invention, what is claimed as new and desired to be protected by Letters Patent includes the following:

1. An electric motor system comprising:
   an electric motor; and
   a motor control subsystem operable to control the electric motor, including detecting and responding to a fault condition in the electric motor, the motor control subsystem including—
      a hardware-based pathway for detecting and initiating a response to the fault condition, the hardware-based pathway including—
         a power module operable to generate a driving waveform to power the electric motor,
         a power inverter operable to convert direct current power to alternating current power at a frequency and an amplitude to power the electric motor, and
         a first resistor block electrically connected between the power inverter and the power module, and operable to generate a first voltage signal that is representative of an electric current flowing to the electric motor,
      wherein the power module compares the first voltage signal to a first predetermined maximum voltage signal, wherein the first voltage signal exceeding the first predetermined maximum voltage signal results in a detected fault condition, and
      wherein, using hardware, the hardware-based pathway responds to the detected fault condition by initiating shutting off the electric motor, and a software-based pathway for detecting and initiating a response to the fault condition, the software-based pathway including—
  a microprocessor connected to the power module, and operable to process digital signals for controlling operation of the power module and the electric motor, and
  a second resistor block electrically connected between the power inverter and the microprocessor, and operable to generate a second voltage signal that is representative of the electric current flowing to the electric motor,
  wherein the microprocessor compares the second voltage signal to a second predetermined maximum voltage signal, wherein the second voltage signal exceeding the second predetermined maximum voltage signal results in the detected fault condition, and
  wherein, using software, the software-based pathway responds to the detected fault condition by initiating shutting off the electric motor, and
wherein the hardware-based pathway and the software-based pathway are substantially independently operable to detect and initiate their responses to the fault condition.

2. The electric motor system as set forth in claim 1, wherein the electric motor is a permanent magnet motor or an induction motor.

3. The electric motor system as set forth in claim 1, wherein the electric motor system is incorporated into a machine selected from the group consisting of: heating and air conditioning machines and household and commercial appliance machines, and the electric motor drives a load selected from the group consisting of: blowers, pumps, and fans.

4. The electric motor system as set forth in claim 1, wherein the fault condition is an over-current condition in which too much current is flowing to the electric motor.

5. The electric motor system as set forth in claim 1, wherein the fault condition is selected from the group consisting of: An over-current condition, an under-current condition, an over-voltage condition, an under-voltage condition, an over-temperature condition, and an under-temperature condition.

6. The electric motor system as set forth in claim 1, wherein the power inverter is part of the power module.

7. The electric motor system as set forth in claim 1, wherein the microprocessor receives the second voltage signal in analog form and converts the second voltage signal to digital form.

8. The electric motor system as set forth in claim 1, wherein the first predetermined maximum voltage and the second predetermined maximum voltage are adjustable.

9. The electric motor system as set forth in claim 1, wherein—
  the hardware-based pathway initiates shutting off the electric motor by initiating shutting off the power inverter, and
  the software-based pathway initiates shutting off the electric motor by initiating shutting off the power inverter.

10. The electric motor system as set forth in claim 1, wherein—
  the hardware-based pathway further responds to the detected fault condition by notifying the software-based pathway of the detected fault condition, and
  the software-based pathway further responds to the detected fault condition by notifying the hardware-based pathway of the detected fault condition.

11. The electric motor system as set forth in claim 10, wherein—
  the hardware-based pathway responds to being notified by the software-based pathway of a detected fault condition by initiating shutting off the electric motor, and
  the software-based pathway responds to being notified by the hardware-based pathway of a detected fault condition by initiating shutting off the electric motor.

12. A motor control system operable to control a permanent magnet motor, including detecting and responding to a fault condition in the permanent magnet motor, the motor control subsystem comprising:
  a hardware-based pathway and a software-based pathway for detecting and initiating a response to the fault condition, wherein
  the hardware-based pathway includes—
    a power module operable to generate a driving waveform to power the permanent magnet motor,
    a power inverter operable to convert direct current power to alternating current power at a frequency and an amplitude to power the permanent magnet motor, and
    a first resistor block electrically connected between the power inverter and the power module, and operable to generate a first voltage signal that is representative of an electric current flowing to the permanent magnet motor,
    wherein the power module compares the first voltage signal to a first predetermined maximum voltage signal, wherein the first voltage signal exceeding the first predetermined maximum voltage signal results in a detected fault condition, and
    wherein, using hardware, the hardware-based pathway responds to the detected fault condition by initiating shutting off the power inverter and by notifying the software-based pathway of the detected fault condition, and
  the software-based pathway includes—
    a microprocessor connected to the power module, and operable to process digital signals for controlling operation of the power module and the permanent magnet motor, and
    a second resistor block electrically connected between the power inverter and the microprocessor, and operable to generate a second voltage signal that is representative of the electric current flowing to the permanent magnet motor,
    wherein the microprocessor compares the second voltage signal to a second predetermined maximum voltage signal, wherein the second voltage signal exceeding the second predetermined maximum voltage signal results in the detected fault condition, and
    wherein, using software, the software-based pathway responds to the detected fault condition by initiating shutting off the power inverter and by notifying the hardware-based pathway of the detected fault condition, and
  wherein the hardware-based pathway and the software-based pathway are substantially independently operable to detect and initiate their responses to the fault condition.

13. The motor control system as set forth in claim 12, wherein the fault condition is an over-current condition in which too much current is flowing to the permanent magnet motor.

14. The motor control system as set forth in claim 12, wherein the power inverter is part of the power module.

15. The motor control system as set forth in claim 12, wherein the microprocessor receives the second voltage signal in analog form and converts the second voltage signal to digital form.

16. The motor control system as set forth in claim 12, wherein the first predetermined maximum voltage and the second predetermined maximum voltage are adjustable.

17. The motor control system as set forth in claim 12, wherein—
the hardware-based pathway responds to being notified by the software-based pathway of a detected fault condition by initiating shutting off the permanent magnet motor, and
the software-based pathway responds to being notified by the hardware-based pathway of a detected fault condition by initiating shutting off the permanent magnet motor.

18. A method of detecting and responding to a fault condition in an electric motor powered by a power inverter which is controlled by a power module and a microprocessor, the method comprising the steps of:
(1) in a hardware-based pathway involving the power module, comparing a first voltage signal to a first predetermined maximum voltage signal, and identifying a detected fault condition if the first voltage signal exceeds the first predetermined maximum voltage signal, wherein the first voltage signal is representative of an electric current flowing to the electric motor;
(2) using hardware to respond to the detected fault condition by initiating shutting off the power inverter and thereby shutting off the electric motor;
(3) in a software-based pathway involving the microprocessor, comparing a second voltage signal to a second predetermined maximum voltage signal, and identifying a detected fault condition if the first voltage signal exceeds the first predetermined maximum voltage signal, wherein the second voltage signal is representative of an electric current flowing to the electric motor; and
(4) using software to respond to the detected fault condition by initiating shutting off the power inverter and thereby shutting off the electric motor;
wherein the hardware-based pathway and the software-based pathway are substantially independently operable to detect and initiate their responses to the fault condition.

19. The method as set forth in claim 18, wherein the fault condition is an over-current condition in which too much current is flowing to the electric motor.

20. The method as set forth in claim 18, wherein—
step (2) further includes notifying the microprocessor of the detected fault condition, and
step (4) further includes notifying the power module of the detected fault condition.

21. The method as set forth in claim 20, wherein—
step (2) further includes the power module responding to being notified by the microprocessor of a detected fault condition by initiating shutting off the electric motor, and
step (4) further includes the microprocessor responding to being notified by the power module of the detected fault condition by initiating shutting off the electric motor.

* * * * *